United States Patent
Scotchmer et al.

(10) Patent No.: US 12,427,598 B2
(45) Date of Patent: *Sep. 30, 2025

(54) WELDING APPARATUS

(71) Applicant: HUYS INDUSTRIES LIMITED, Weston (CA)

(72) Inventors: Nigel Scotchmer, Willowdale (CA); Franklin Rementer, Dover, DE (US); Kevin Chan, Hamilton (CA)

(73) Assignee: HUYS INDUSTRIES LIMITED, Weston (CA)

( * ) Notice: Subject to any disclaimer, the term of this patent is extended or adjusted under 35 U.S.C. 154(b) by 926 days.

This patent is subject to a terminal disclaimer.

(21) Appl. No.: 17/227,942

(22) Filed: Apr. 12, 2021

(65) Prior Publication Data

US 2021/0229207 A1   Jul. 29, 2021

Related U.S. Application Data

(63) Continuation-in-part of application No. 15/624,869, filed on Jun. 16, 2017, now Pat. No. 10,974,342.

(60) Provisional application No. 62/353,189, filed on Jun. 22, 2016.

(51) Int. Cl.
  *B23K 11/31* (2006.01)

(52) U.S. Cl.
  CPC ................ *B23K 11/314* (2013.01)

(58) Field of Classification Search
  CPC ... B23K 11/314; B23K 11/0053; B23K 11/03; B23K 11/3072; B23K 37/02; F16B 21/18
  See application file for complete search history.

(56) References Cited

U.S. PATENT DOCUMENTS

| | | |
|---|---|---|
| 2,470,552 A | 5/1949 | Gottschalk |
| 3,134,883 A | 5/1964 | Bennett et al. |
| 3,238,352 A | 3/1966 | Kollmann et al. |

(Continued)

FOREIGN PATENT DOCUMENTS

| | | |
|---|---|---|
| CA | 902189 | 6/1972 |
| CA | 1 177 545 | 11/1984 |

(Continued)

OTHER PUBLICATIONS

The Melting Points of Metals, 2020, metalsupermarkets.com, pp. 4-5 (Year: 2020).*

(Continued)

*Primary Examiner* — Tiffany T Tran
(74) *Attorney, Agent, or Firm* — Vorys, Sater, Seymour and Pease LLP; Rex W. Miller, II

(57) ABSTRACT

A welding electrode apparatus has a base member and a locking ring for clamping a consumable electrode tip to the electrode base. The base and the tip are predominantly made of copper, or a copper alloy. The base member has a first end that is threaded to fit a welding head that supplies electric current; and an electrically conductive second end to which the electrode tip is mounted. The second portion has an externally facing, axially extending cylindrical wall. A circumferential groove is formed in the wall. The locking ring has a quick-disconnect feature in the form of an array of spring-loaded detents that deflect to release the cylindrical wall of the first member, and that spring inwardly to seat in the circumferential groove.

20 Claims, 11 Drawing Sheets

(56) References Cited

U.S. PATENT DOCUMENTS

| | | |
|---|---|---|
| 3,643,059 A | 2/1972 | Hill |
| 3,657,509 A | 4/1972 | Beneteau |
| 4,020,316 A | 4/1977 | Schaft et al. |
| 4,029,931 A | 6/1977 | Simmons |
| 4,609,805 A | 9/1986 | Tobita et al. |
| 4,861,961 A | 8/1989 | Huys |
| 4,866,237 A | 9/1989 | Inoue |
| 4,947,019 A | 8/1990 | Akiyama et al. |
| 5,281,789 A | 1/1994 | Merz et al. |
| 5,448,035 A | 9/1995 | Thutt et al. |
| 5,471,029 A | 11/1995 | Simmons |
| 5,688,364 A | 11/1997 | Sato |
| 5,914,057 A | 6/1999 | Nippert et al. |
| 6,020,568 A | 2/2000 | Joseph |
| 6,259,057 B1 * | 7/2001 | Lai .................. B23K 26/1462 219/121.73 |
| 6,452,130 B1 | 9/2002 | Qian et al. |
| 6,624,379 B1 | 9/2003 | Thornton et al. |
| 6,750,419 B2 | 6/2004 | Roddy et al. |
| 6,875,946 B2 | 4/2005 | Hidaka |
| 7,538,294 B2 | 5/2009 | Scotchmer |
| 8,101,040 B2 | 1/2012 | Shibata et al. |
| 8,513,561 B2 | 8/2013 | Kuechenmeister et al. |
| 9,211,604 B2 | 12/2015 | Ikoma |
| 9,440,308 B2 | 9/2016 | Roddy et al. |
| 10,974,342 B2 * | 4/2021 | Scotchmer ......... B23K 11/0046 |
| 2003/0209530 A1 * | 11/2003 | Stuart .................. B23K 9/122 219/137.61 |
| 2005/0092728 A1 | 5/2005 | Barbeau et al. |
| 2006/0029512 A1 | 2/2006 | Dong et al. |
| 2007/0199556 A1 | 8/2007 | Murai et al. |
| 2008/0190899 A1 | 8/2008 | Sugahara et al. |
| 2010/0012637 A1 * | 1/2010 | Jaeger .................. B23K 9/323 219/136 |
| 2011/0042356 A1 | 2/2011 | Leung et al. |
| 2013/0092435 A1 | 4/2013 | Spencer et al. |
| 2013/0260648 A1 | 10/2013 | Rementer |
| 2014/0131336 A1 * | 5/2014 | Jacques ................ B23K 9/323 219/137.63 |
| 2015/0247598 A1 * | 9/2015 | Bruckner ............. F16L 21/00 285/317 |
| 2017/0348788 A1 * | 12/2017 | Chen .................. B23K 11/36 |

FOREIGN PATENT DOCUMENTS

| | | |
|---|---|---|
| CA | 2712119 A1 | 2/2011 |
| CN | 102019531 A | 4/2011 |
| CN | 202070850 U | 12/2011 |
| CN | 103042298 A | 4/2013 |
| CN | 203071904 A | 5/2013 |
| CN | 203018902 U | 6/2013 |
| CN | 103993312 A | 8/2014 |
| DE | 10209492 A1 | 10/2003 |
| EP | 0 192 880 A1 | 9/1986 |
| JP | 7-314152 | 12/1995 |
| KR | 10-2015-0008730 | 1/2015 |
| WO | 95/11107 A1 | 4/1995 |
| WO | 2006/122410 A1 | 11/2006 |
| WO | 2008/144873 A1 | 12/2008 |

OTHER PUBLICATIONS

Park et al., "Numerical Simulation of Plunge Force during the Plunge Phase of Friction Stir Welding and Ultrasonic Assisted FSW", IMECE2008-67002, 2008 ASME International Mechanical Engineering Congress and Exposition, Oct. 31, 2008-Nov. 6, 2008, Boston, Massachusetts, U.S.A. pp. 1-6.

Chen et al., Surface modification of resistance welding electrodes by electro-spark deposited composite coatings Jail II, Metallurgical behavior during welding, www.elsevier.com, Science Direct, Surface & Coatings Technology 201 ;2006), pp. 2419-2430.

Chen et al., Surface modification of resistance welding electrode by electro-spark deposited composite coatings: art I, Coating characterization, www.elsevier.com, ScienceDirect, Surface & Coatings Technology 201 (2006), pp. 1503-1510.

Zou et al-1 "Surface modified long-life electrode for resistance spot welding of Zn-coated steel", www.elsevier.com, 3cienceDirect, Journal of Materials Processing Technology 209 (2009), pp. 4141-4146.

Kumar, "Ultrasonic assisted friction stir processing of 6063 aluminum alloy", www.elsevier.com, ScienceDirect, Archives of Civil and Mechanical Engineering 16 (2016), pp. 473-484.

Avettand-Fenoel et al., "A review about Friction Stir Welding of metal matrix composites", www.elsevier.com, ScienceDirect, Materials Characterization 120 (2016), pp. 1-17.

Lu, "Improvement of copper plating adhesion on silane modified PET film by ultrasonic-assisted electroless deposition", www.elsevier.com, ScienceDirect, Applied Surface Science 256 (2010), pp. 3554-3558.

Liu, "Elimination of tunnel defect in ultrasonic vibration enhanced friction stir welding", www.elsevier.com, ScienceDirect, Materials and Design 90 (2016), pp. 350-358.

Wang et al., "Si particulate-reinforced Zn—Al based composites joints of hypereutectic Al-50Si alloys by ultrasonic-assisted soldering", www.elsevier.com, ScienceDirect, Materials and Design 107 (2016), pp. 41-46.

Niksefat et al., "Mechanical and electromechanical properties of ultrasonic-assisted electrodes deposition of Ni—B—TiO2 composite coatings", www.elsevier.com, ScienceDirect, Journal of Alloys and Compounds 633 (2015), pp. 127-136.

Zhao et al., "Microstructure evolution and mechanical properties of ultrasonic-assisted soldering joints of 2024 aluminum alloys", www.elsevier.com, ScienceDirect, Trans Nonferrous Met. Soc. China 21 (2011), pp. 1937-1943.

Rostamiyan et al., "Experimental studies on ultrasonically assisted friction stir spot welding of AA6061", www.elsevier.com, ScienceDirect, Archives of Civil and Mechanical Engineering 15 (2015), pp. 335-346.

Chen et al., Surface Modification of Resistance Welding Electrodes by Electra-Spark Deposited Coatings, Department of Mechanical Engineering; University of Waterloo; Waterloo, ON, Canada; Coatings 2005; Materials Science & Technology 2005, pp. 59-62.

* cited by examiner

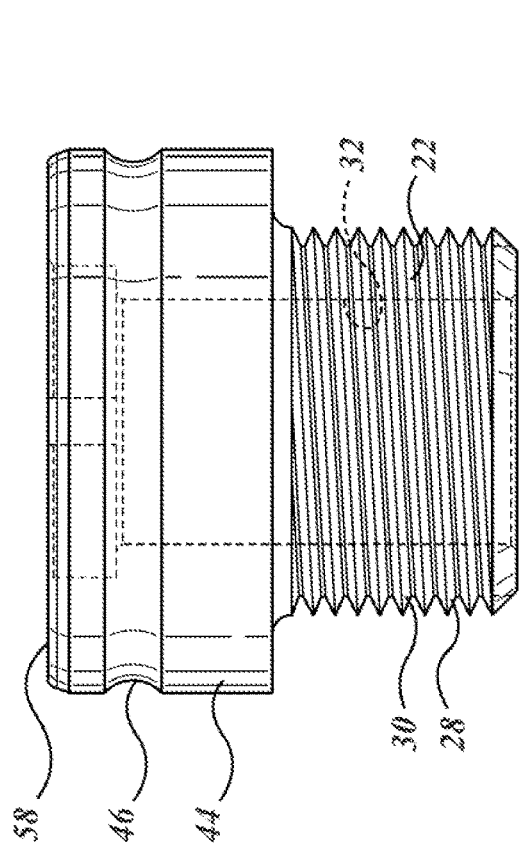
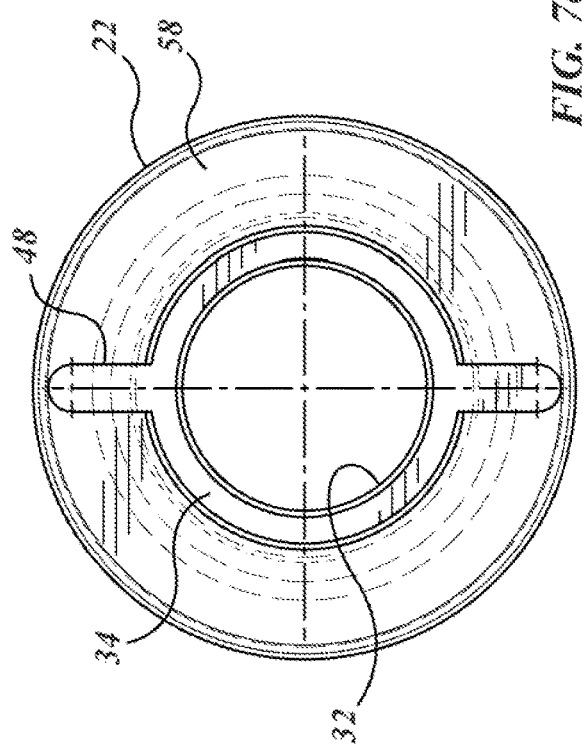
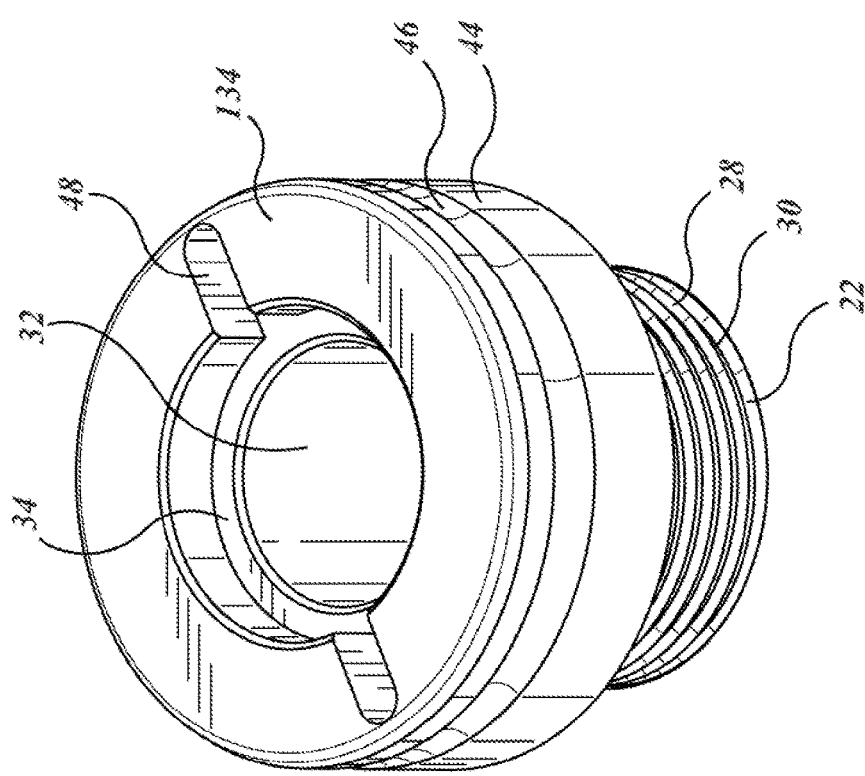
FIG. 7a
FIG. 7b
FIG. 7c

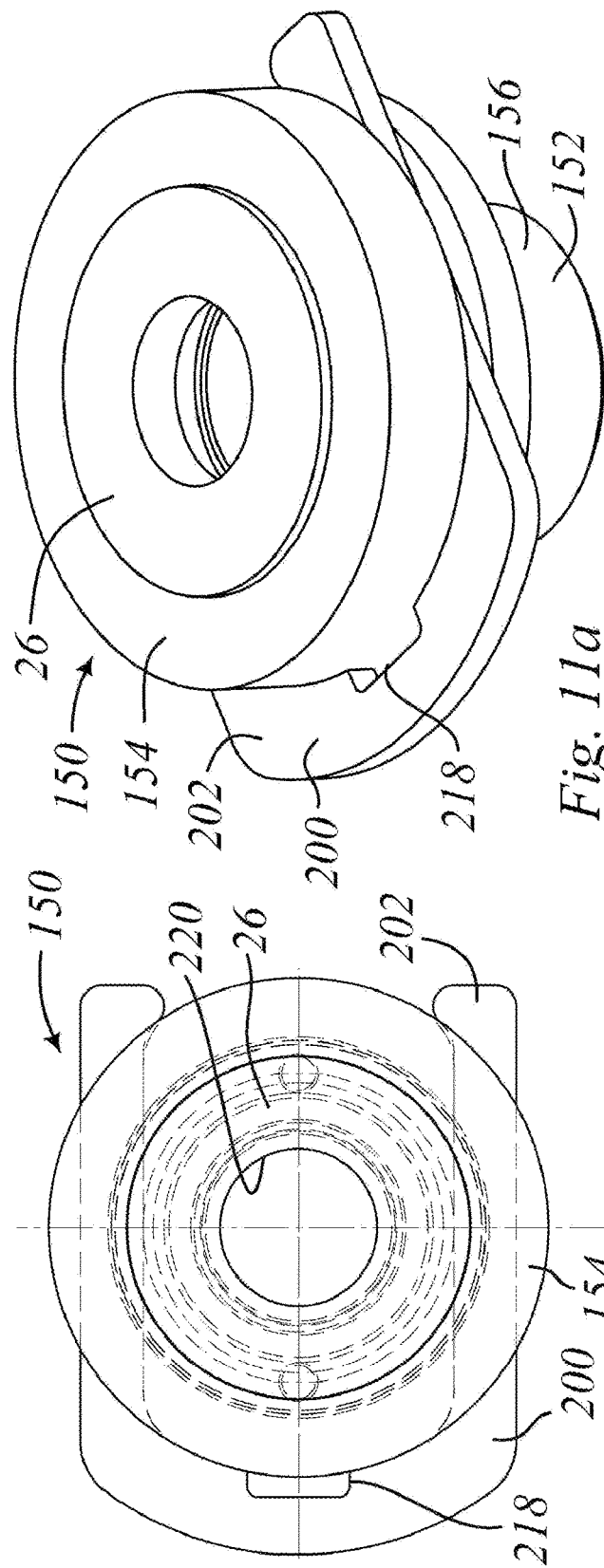
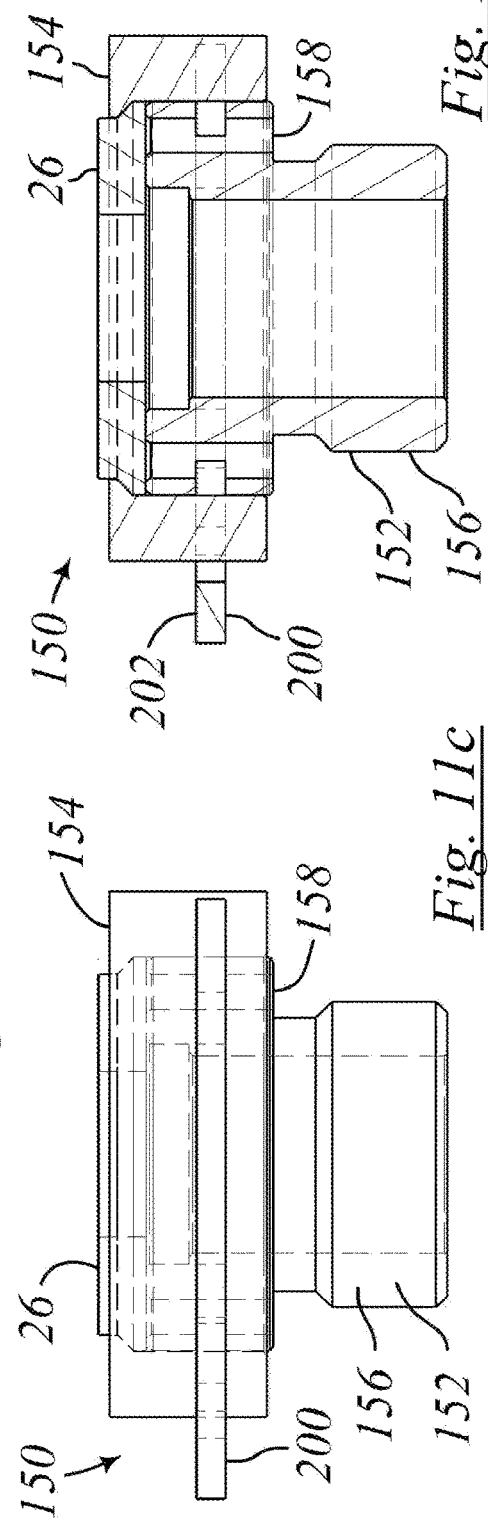

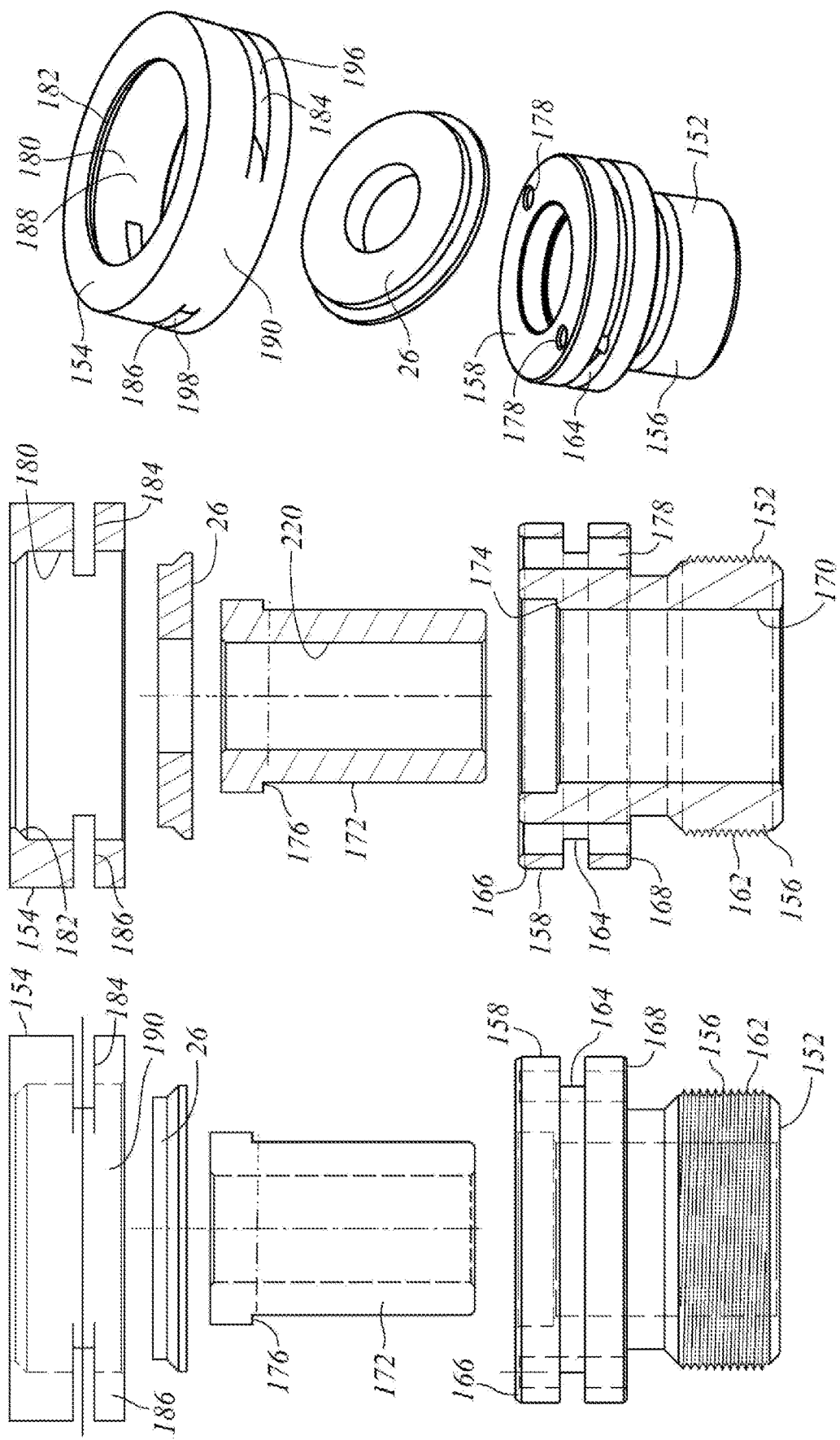

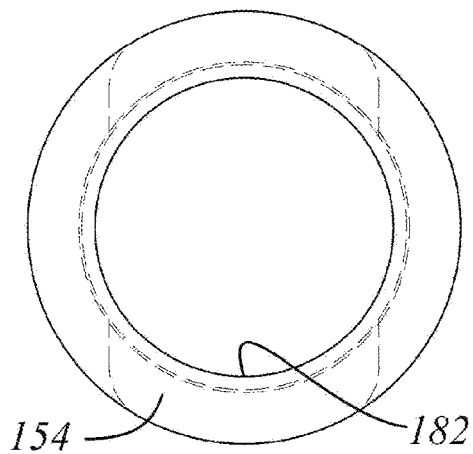
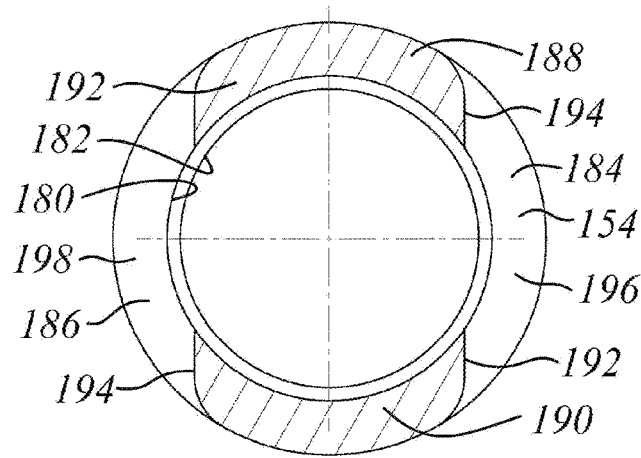
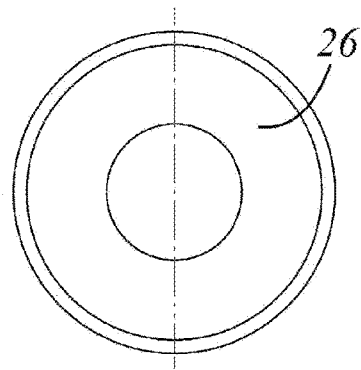
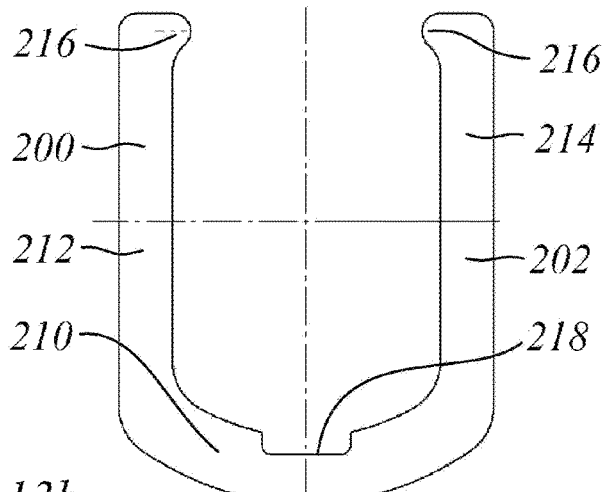
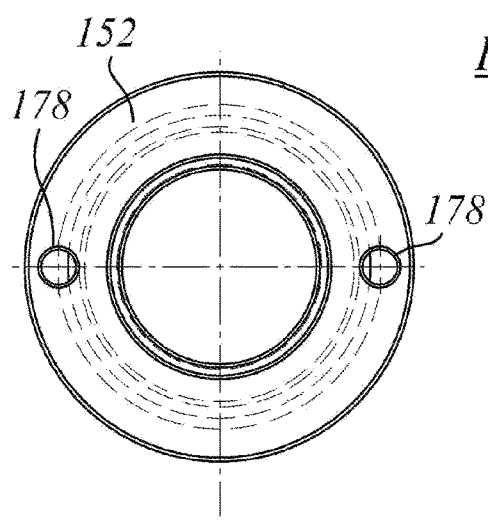
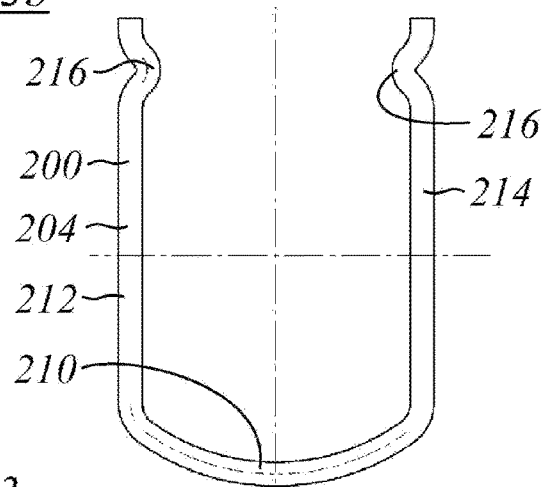
*Fig. 13a*
*Fig. 13b*
*Fig. 13c*

WELDING APPARATUS

RELATED APPLICATIONS

This application claims benefit as a continuation-in-part of U.S. patent application Ser. No. 15/624,869 filed Jun. 16, 2017, and U.S. Prov. Pat. App. Ser. No. 62/353,189 filed Jun. 22, 2016, the specifications and drawings thereof being incorporated in their entirety herein by reference.

FIELD OF THE INVENTION

This invention relates to the field of welding equipment.

BACKGROUND OF THE INVENTION

In automated processes, such as in the automotive industry, nuts and studs may be welded to body components, such as formed steel and aluminum alloy sheet members, prior to assembly. The nuts and studs are typically welded to the sheet at specified locations. The head of the welding electrode has a limited life, for many reasons. Typically the electrode tip is made of a copper alloy and is consumed over time, as the repeated heating and cooling of the tip degrades the tip. Especially where the nuts and studs are fed to the welding electrode heads automatically, it is not desirable to weld the nuts in the wrong location or upside down.

SUMMARY OF THE INVENTION

In an aspect of the invention there is a welding electrode apparatus. It has a first member, a second member, and a third member. The first member defines an electrode base for connection to a power source. The third member defining an electrically conductive tip for mounting in electrically conductive engagement to the electrode base. The second member defines a clamp operable to secure the third member to the first member. The first member and the second member are mutually engageable. There is a displaceable release member permitting disengagement of the second member from the first member.

In a feature of that aspect of the invention, the displaceable release member is resiliently biased. In another feature, when the first and second members are engaged, the displaceable release member is entrapped therebetween. In another feature, the first member and the third member are each made of a material that is predominantly copper. In another feature, the release member has a higher melting point than copper. In another feature, the release member includes a movable detent.

In yet another feature, at least the first member and the third member are each made of a material that is predominantly copper. The second member is a locking ring. The release member includes a spring-biased detent, the spring biased detent being made of a material having a higher melting point than copper. The spring-biased detent is captured between the first member and the second member when the second member is seated on the first member. In a further feature, the first member has an external relief. The release member is mounted within the locking ring. The release member deflects to permit installation of the locking ring. The release member is biased to engage the relief to seat the locking ring relative to the first member. In another further feature, the apparatus has a plurality of the release members. The first member has an external peripheral relief. The second member has an array of accommodations, and each of the plurality of release members seats in a corresponding one of the accommodations. The second member has a peripherally extending relief and a spring mounted therein. The spring bounding the accommodations of the release members, and, as so mounted, urging the release members inwardly toward the first member as assembled.

In an alternate feature, the first member comprises an externally threaded welding base, and an internally threaded sleeve engageable to the externally threaded welding base; and the release member engages the sleeve.

In another aspect of the invention there is a welding electrode apparatus that has a base member and a locking ring. The base member has first and second portions. The first portion is threaded to permit said base portion to be mounted to a welding head. The second portion extends axially from the first portion. The second portion has a first end adjoining the first portion and a second end distant from the first portion. The second end has an electrically conductive seat. The second portion has an externally facing, axially extending cylindrical wall extending between the first and second ends. The cylindrical wall has an indexing fitting. The locking ring is sized to seat about the second portion of the base member. It has a retainer mounted to capture a welding tip next to the electrically conductive seat of the base member. The locking ring has an internally located, resiliently mounted release member biased toward engagement with the indexing fitting of the cylindrical wall.

In a feature, the indexing feature is a circumferential groove formed in the cylindrical wall; and the release member of the locking ring includes at least one spring-loaded ball-bearing, said ball-bearing being biased to seat in the groove on installation. In another feature, the locking ring includes an external housing that has a raise relief grip.

In another aspect of the invention, there is any apparatus substantially as shown or described herein, in whole or in part.

BRIEF DESCRIPTION OF THE DRAWINGS

These aspects and other features of the invention can be understood with the aid of the following illustrations of a number of exemplary, and non-limiting, embodiments of the principles of the invention in which:

FIG. 7*a* is a perspective view of a welding base of the apparatus of FIG. 1;

FIG. 7*b* shows a side view of the welding base of FIG. 7*a;*

FIG. 7*c* shows a top view of the welding base of FIG. 7*a;*

FIG. 11*a* shows a perspective view of an alternate apparatus to that of FIG. 1;

FIG. 11*b* is a top view of the apparatus of FIG. 11*a;*

FIG. 11*c* is a side view of the apparatus of FIG. 11*a;*

FIG. 11*d* is a section, viewed as if from the perspective of FIG. 11*c* on the diametral vertical plane of the apparatus of FIG. 11*b*;

FIG. 12*a* is an exploded view of the apparatus of FIG. 1*ha* prior to entrapment of a welding tip between the base and quick release locking ring;

FIG. 12*b* is a side view of the apparatus of FIG. 12*a* in an exploded form;

FIG. 12*c* is a vertical diametral cross-section of the apparatus of FIG. 12*b*;

FIG. 13*a* is a set of top view of the locking ring, welding tip, and base member of the apparatus of FIG. 12*a*;

FIG. 13*b* is a horizontal section, as viewed from above, of the locking ring of FIG. 13*a*, shown with a resilient spring-biased member; and FIG. 13*c* is a top view of an alternate spring-biased member to FIG. 13*b*.

DETAILED DESCRIPTION

Figure 1:
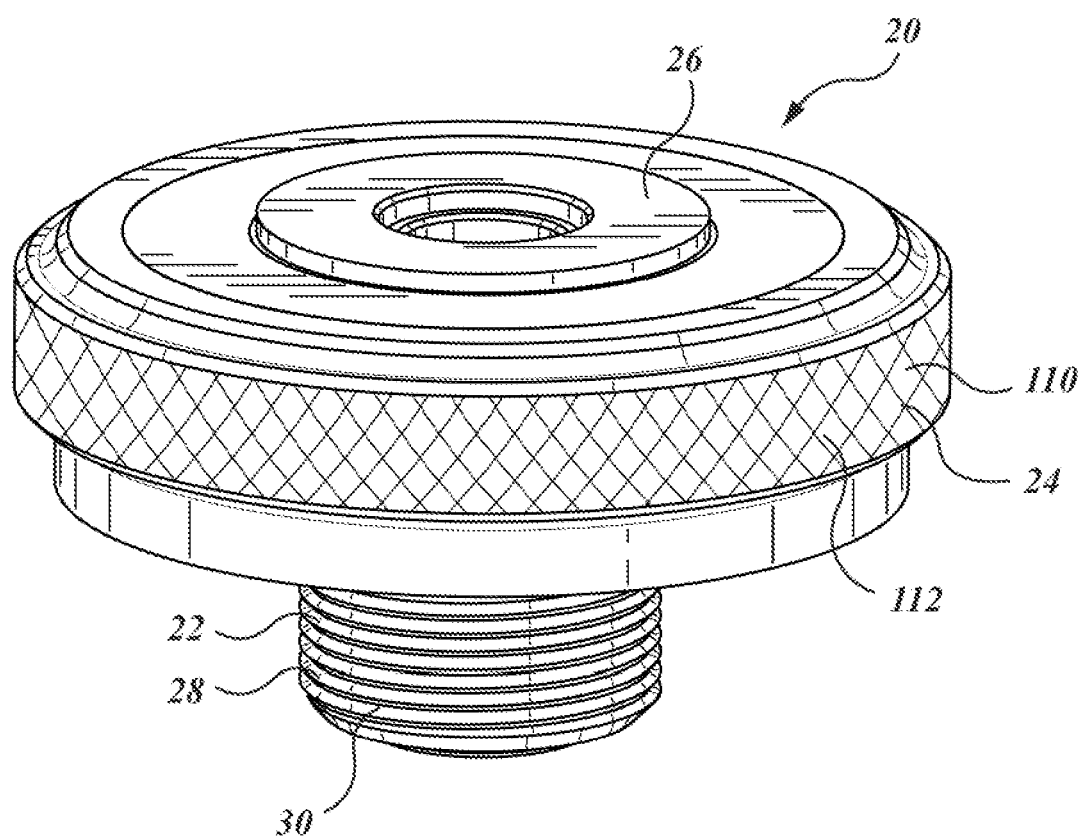
FIG. 1 shows a perspective view of a welding apparatus.
Figure 2:
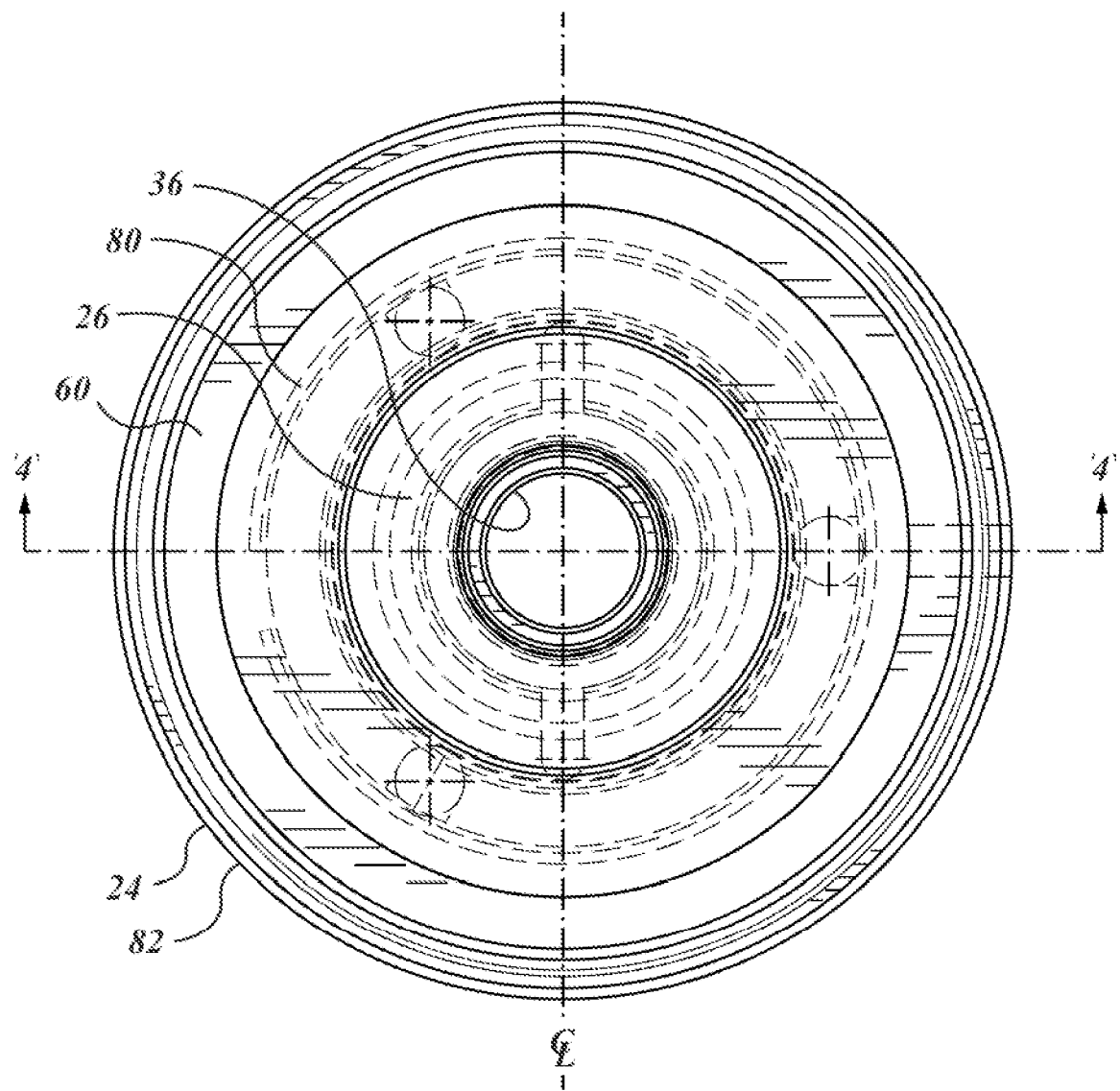
FIG. 2 shows a top view of the welding apparatus of FIG. 1.
Figure 3:
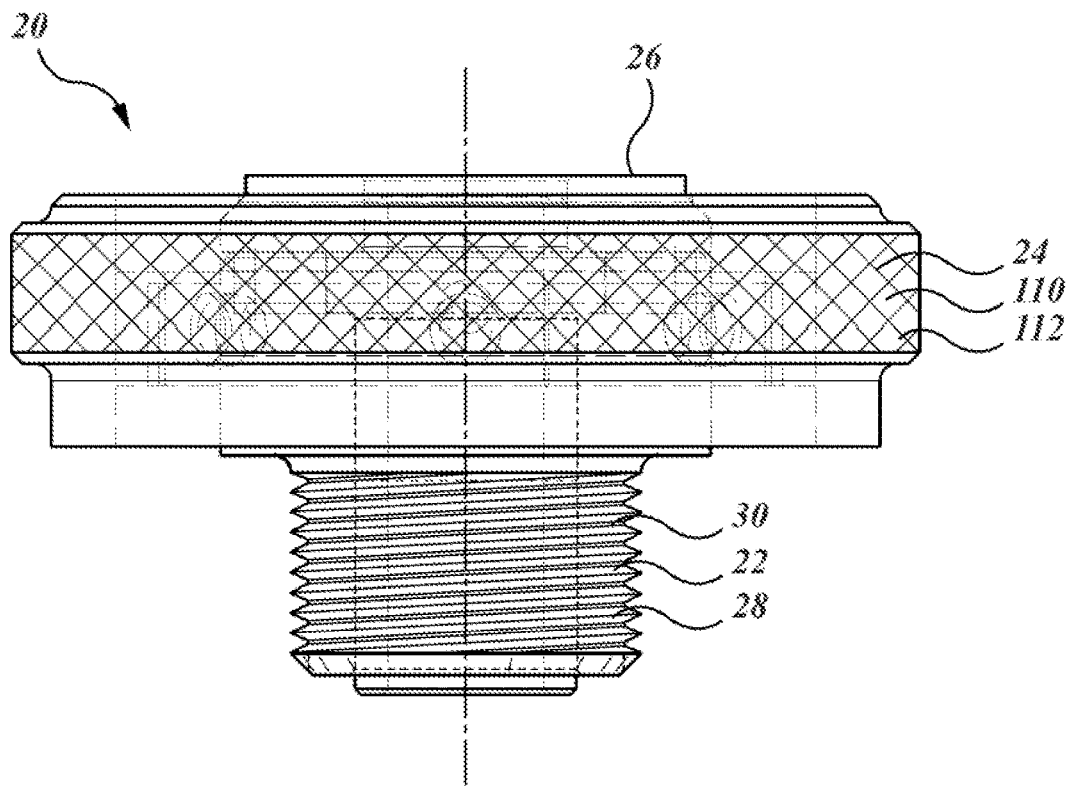
FIG. 3 shows a side view of the welding apparatus of FIG. 1.

The description that follows, and the embodiments described therein, are provided by way of illustration of an example, or examples, of particular embodiments incorporating one or more of the principles, aspects, and features of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims are not limited to apparatus or processes having all of the features of any one apparatus or processes described below, or to features common to multiple or all of the apparatus described below. It is possible that an apparatus, feature, or process described below is not an embodiment of any claimed invention.

For the purposes of this description, a cylindrical polar frame of reference may be used. That is, the description may pertain to welding heads, welding rods, and so on, that are formed as bodies of revolution about a central axis. In such a frame of reference, the axis, being the long axis of the apparatus, may be the vertical or z-axis. In such a frame of reference, the long, or largest, dimension of an object may be considered to extend in the direction of the z-axis, the base of the article, where substantially planar, may be considered to extend in an r-theta plane, and the height of the article may be measured in the vertical or z-direction. Unless noted otherwise, the terms "inside" and "outside", "inwardly" and "outwardly", refer to location or orientation relative to the central axis. In this description, when an item, or structure, is indicated as being insulated, such term is understood to mean that the wall has a layer of insulation. In this specification, the commonly used engineering terms "proud", "flush", and "shy" may be used to denote items that, respectively, protrude beyond an adjacent element, are level with an adjacent element, or do not extend as far as an adjacent element, the terms corresponding conceptually to the conditions of "greater than", "equal to" and "less than".

The terminology used in this specification is thought to be consistent with the customary and ordinary meanings of those terms as they would be understood by a person of ordinary skill in the art in North America. The Applicants expressly exclude all interpretations are inconsistent with this specification, and, in particular, any interpretation of the claims or the specification such as may be made in the USPTO, or in any other Patent Office, other than those interpretations for which express support can be demonstrated in this specification or in objective evidence of record, demonstrating how the terms are used and understood by persons of ordinary skill in the art, or by way of expert evidence of a person or persons of experience in the art.

In this description the terms "non-electrically conductive" or "electrically insulated" may be used. The electrical conductivity of materials may vary by many orders of magnitude, from highly conductive materials, such as pure copper, gold, or aluminum to extremely poor conductors, such as bakelite, ceramics, rubbers, and so on. In context, "non-electrically conductive" and "electrically insulated" may be understood by comparison to the electrical conductivity of the copper electrode base and the copper or copper-alloy electrode tip, which are intended to conduct high electrical current for welding, and less conductive materials or coatings that are intended not to allow sufficient current flow for welding to occur.

In the examples herein, the non-electrically conductive elements may include oxide coatings or finishes, or may include ceramic or quasi-ceramic coatings. These finishes or coatings, however they may be terms, may include coatings such as an Aluminum Oxide $Al_2O_3$ coating such as may tend to anodize the surface and make it non-conductive. Such coatings may tend to be resistant to conduction at relatively high temperatures.

Figure 4:
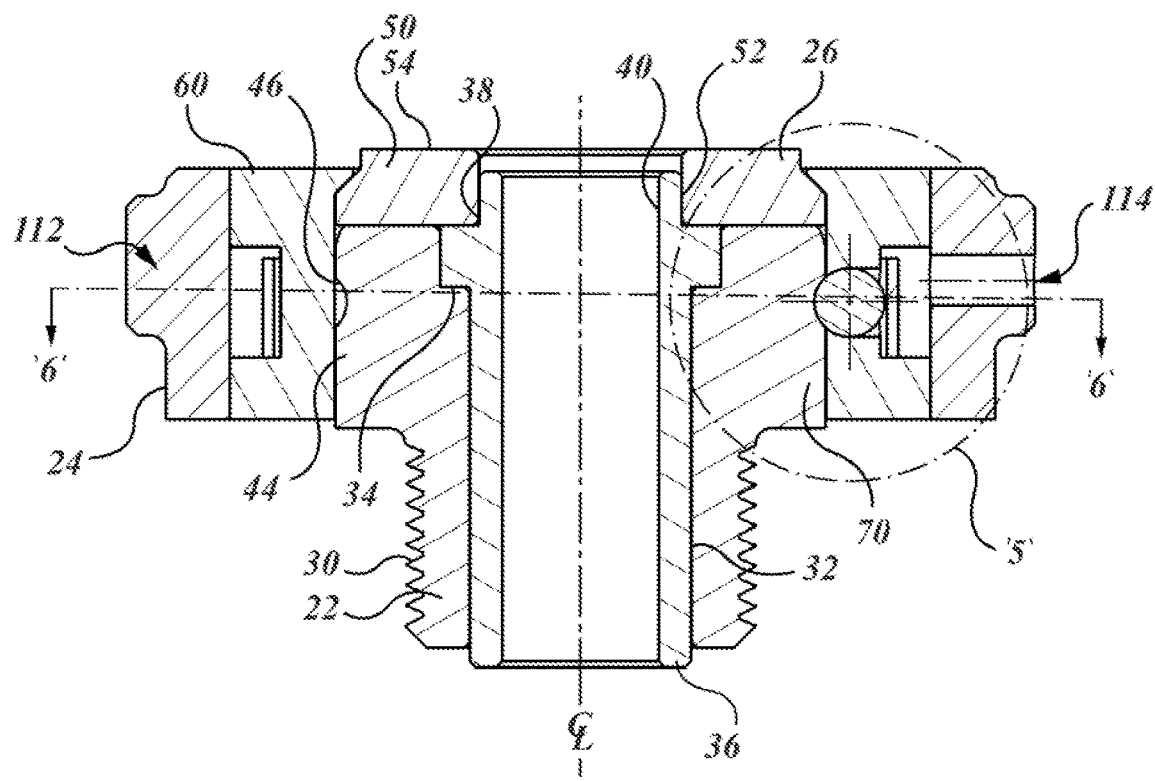
FIG. 4 shows a diametric vertical section of the apparatus of FIG. 2.
Figure 5:
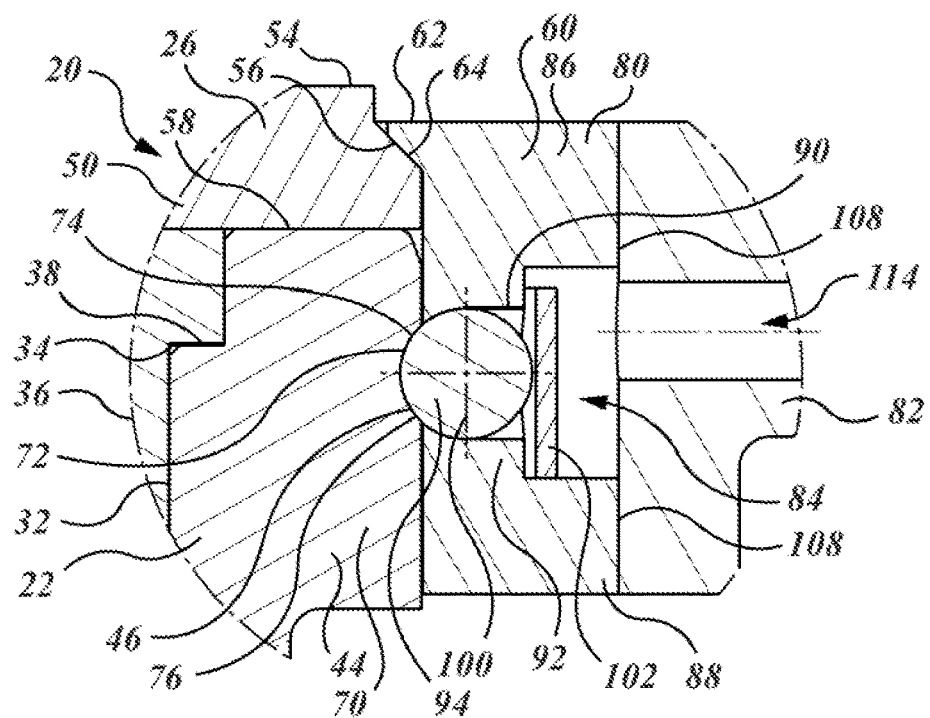
FIG. 5 is an enlarged detail of the apparatus of FIG. 1, indicated at '5'.
Figure 6:
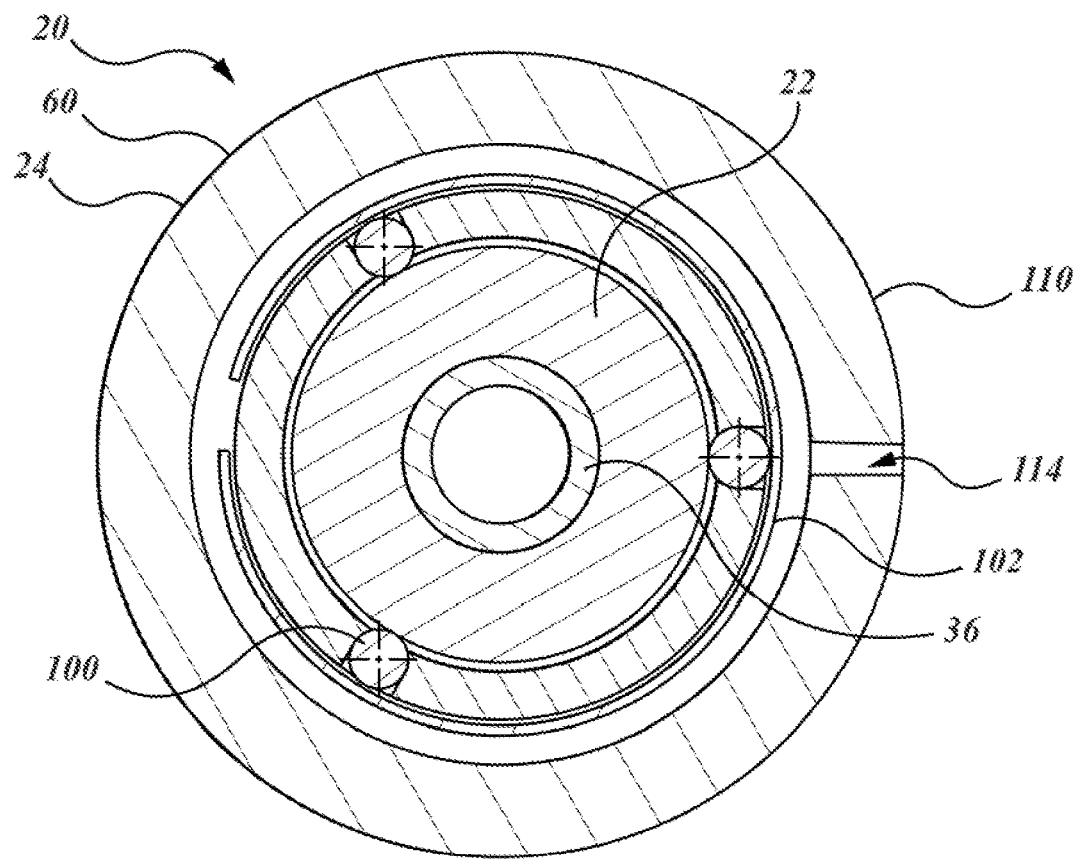
FIG. 6 is a horizontal section of the apparatus of FIG. 1 on section '6-6'.
Figure 8:
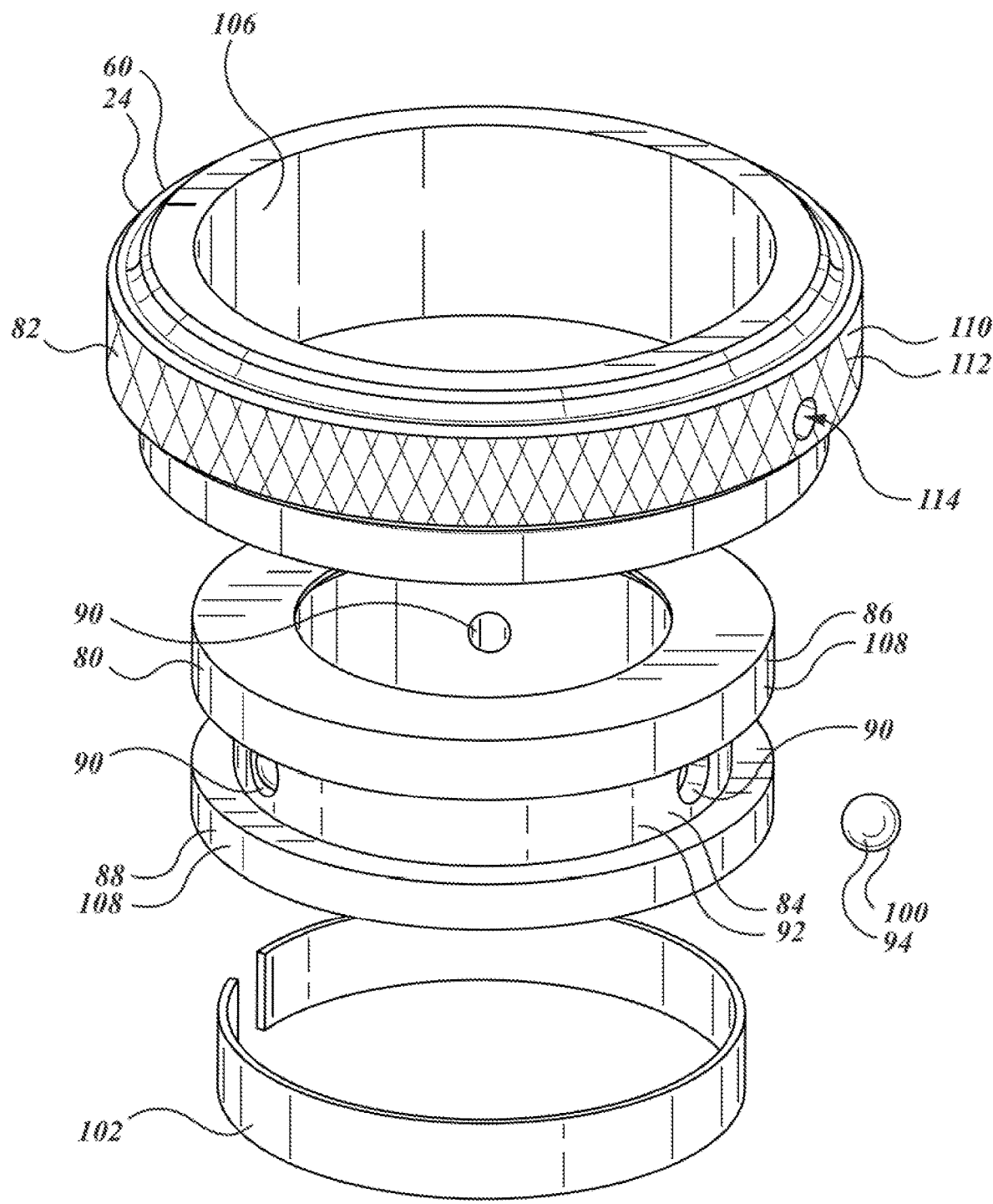
FIG. 8 is an exploded perspective view of a locking ring of the welding apparatus of FIG. 1.
Figure 10:
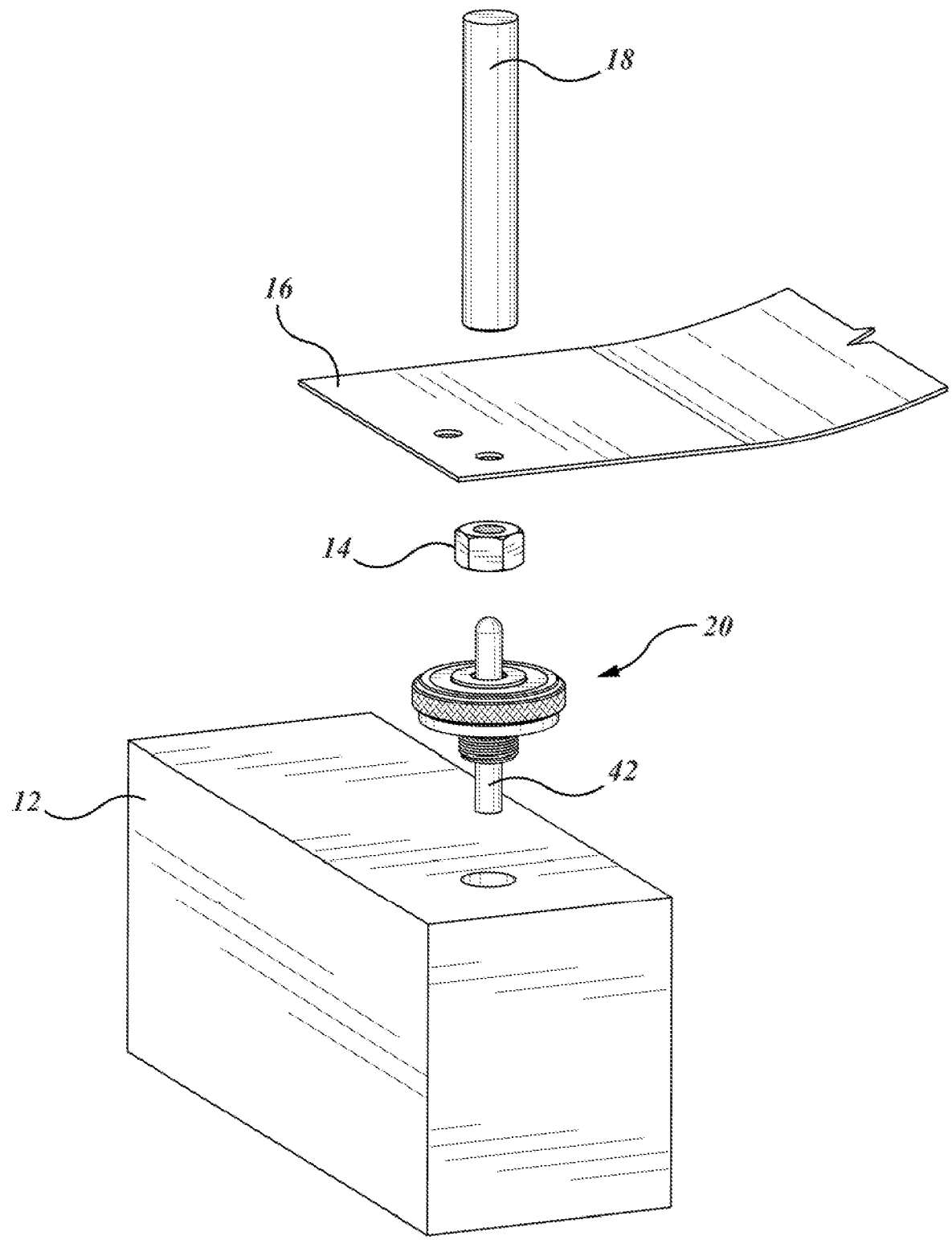
FIG. 10 shows a perspective view of a welding head arrangement for welding apparatus of FIG. 1.

A welding apparatus is shown in perspective view in FIGS. 1 and 10 and in central vertical cross-section in FIG. 4 generally as 20. It may be used for welding on an automotive assembly line. A welding head identified as apparatus 20 may typically be opposed by a co-operating welding head, or welding apparatus 18. In operation, a welding head such as apparatus 20 is mounted in a tool base 12 and carries a nut 14, or stud, or other weldable fastener. A workpieces, such as a mild steel sheet 16 of an auto body panel is placed between welding head or apparatus 20 and a co-operating opposed welding head. The welding heads are brought together to squeeze the nut against the steel sheet. When the materials are held together in contact, often under axial pressure, an electrical current is applied, causing the parts to weld together. It is arbitrary which of apparatus is considered the male or female electrode, or whether one, the other, or both are movable.

Welding apparatus 20 has a first member 22, a second member 24, and a third member 26. First member 22 may be a main body member, identified as an electrode base. It is typically made of copper. It has a first, or lower, end 28 that is externally threaded as at 30, by which it is screwed into an electrode holder, thereby being connected to a power source of the welding apparatus. The inside of electrode base 22 defines, or has, a smooth bore 32 that has a larger radius shoulder 34 at the upper end. An insulation sleeve 36 sits within bore 32, the sleeve having a mating outwardly extending shoulder 38 that seats in shoulder 34 of bore 32. Insulation sleeve 36 also has an upwardly extending annular stub 40. Insulation sleeve 36 may be a ceramic member, or an anodized plug. A reciprocating centering pin 42 (FIG. 10) typically moves axially within sleeve 36, and is used to center the machine fed fastener on apparatus 20. The centering pin is typically non-conductive, and may be an anodized part. First member 22 also has an upper portion 44 that has, or includes, a locking ring engagement interface, as at 46.

Third member 26 may be a welding electrode tip such as may have the form of an electrically conductive copper annulus, or washer, or disc 50 that has a central bore 52 that seats about axially protruding stub 40 of sleeve 36. Bore 52 has a length that is longer than the length $L_{40}$ of stub 40, the excess length defining a well or socket in which to seat the machine-fed fastener. The inlet of bore 52 is typically chamfered or radiused to facilitate seating of the fastener therein. Copper disc 50 also has an external land, or engagement surface 54, which may be in the form of an axially truncated conical ring 56; and an electrically conductive end face 58 that defines the engagement interface with machine fed fastener.

Second member 24 may be an annular clamping member 60 that removably mates with the upper portion 44 of first member 22. Clamping member 60 has a radially inwardly extending arm, or surround, or finger 62. Finger 62 may have a lower radially innermost margin having a conical surface 64. Surface 64 mates with conical surface of external land 54. When clamping member 60 is seated on the engagement interface defined by conical ring 56, the resulting positioning causes surface 64 to engage land 54 and clamp disc 50 against the axially upward end face of main body or base 22. A path for electric current is then established through the large, annular, planar contact surfaces of base member 22 and disc 50.

In this description, the second member, or clamp, or clamping member 60, may be indicated as having a land, such as surface 64. The term "land" in this context may refer to a member, such as a continuous peripheral bezel, having an aperture formed therethrough, the aperture having a continuous periphery, or a set of tabs or tangs, or fingers, or protrusions, or islands, i.e., a plurality of discrete members that co-operate, as may intercept the passage of larger or misshapen objects. In context, the "land" is the surface, or array, presented to intercept incorrectly sized, incorrectly shaped, or incorrectly oriented objects, as may be.

In known assemblies, first member 22, second member 24 and third member 26 are all made of copper or copper alloys. First member 22 may typically be made of pure copper, or an alloy with a very high percentage of copper by weight. Second member 24 may be made of the same alloy, or possibly an alloy of greater strength. Third member 26 may be made of an alloy such as a beryllium-copper alloy. Third member 26 may also have an upper surface that has a ceramic coating, such as TiC or $Ti_2B$.

A welding electrode assembly 20, such as shown, may have electrical discharge currents of up to 45 kA. Disc 50 is intended to be consumable over time—typically about 15,000 cycles. When the point is reached that disc 50 ought to be replaced, locking ring 60 is removed, and, the old disc 50 is removed, a new disc 50 is added, and locking ring 60 is replaced. Replacement of the tip, of third member 26, is relatively inexpensive as compared to replacement of either second member 24 or first member 22. However, the inventor has observed that in this process it is not uncommon for locking ring 60 to be mis-threaded on re-installation, which tends to destroy either locking ring 60, or first member 22, or both. When this happens, fixing or replacing the parts may tend to require more cost and effort to correct.

First member 22 is externally threaded to fit into conventional welding equipment. Once in place, first member 22 may be expected to stay in place for a long time, during which several discs 50 may be consumed.

Upper portion 44 of first member 22 may have a circular cylindrical shape, as at wall 70. At a mid-height location, wall 70 may have a relief, or accommodation, or rebate, or passage, or channel, or groove, however it may be called, indicated as 72 that defines the indexing fitting or locking ring engagement fitting 46. Accommodation may have the form in cross-section of a channel, such as a circular arc. The arc may have shallowly angled edges. The upper edge 74 may act as both a seat and as a cam. The lower edge 76 may be the same as the upper edge. Alternatively, lower edge 76 may be more steeply angled, or may be square. Even as square it may act as a seat, and it may not be needed as a cam. End face 58 may have one or more indexing members, or dogs, or keyways, such as slots 48 which permits engagement by a tool such as a wrench to tighten and loosen first member 22 on installation or removal.

Locking ring 60 may have a first member or first portion, which may be identified as a body 80, and a second member, or second portion, which may be identified as an external housing 82. Internal body 80 may have the form of hollow cylinder with a relatively thick external annular wall. An accommodation, or seat, or relief or rebate, or groove, or channel, 84 is formed peripherally, i.e., circumferentially, in the external or outwardly oriented face of body 80, such that body 80 has something of a bobbin shape, with a central portion of reduced diameter bracketed by end portions, or upper and lower cheeks, 86, 88, of larger diameter.

An array of accommodations or apertures, or passages, or seats, or openings 90 is formed through the inside channel back wall, i.e., wall 92. These apertures may have a larger entrance on the radially outward side, and a smaller entrance on the radially inner side.

Locking ring 60 has a set of release members, or indexing members, or detents, or dogs, 94, which may be in the form of spherical balls, such as stainless steel ball bearings 100. The diameter of ball bearings 100 is smaller than the radially outward entrance of opening 90, but is larger than the radially inner entrance of opening 90, such that each ball bearing 100 can seat in opening 90, but cannot pass through it. The inner extremity of ball bearing 100 can thus protrude radially inwardly proud of the inner surface of inner wall 92. The diameter of ball bearing 100 is larger than the radial through-thickness of wall 92, such that even when seated as far inwardly as possible, the radially outermost extremity of ball bearing 100 protrudes radially outwardly of wall 92 into channel 84. A substantially circular spring 102, which may be a spring brass or a spring steel, locates in channel 84, and engages ball bearings 100, and resiliently urges them radially inwardly so that, in use, they are biased toward first member 22.

The inside face 106 of second member 82 is threaded to engage threads 108 of the outside of cheeks 84, 86, enclosing and concealing channel 84 and spring 102. The outside face 110 of second member 82 is provided with a relief feature, or features, such as a grip, or knurling as at 112 to permit locking ring 60 to be more readily grasped for installation or removal. An air vent in housing member 82 is shown at 114.

The inside diameter of wall 92 is sized to fit closely outside the outside diameter of wall 70. When locking ring 60 moves in the axial direction, for example downward onto first member 22, wall 92 slides past wall 70. The lead-in chamfer at the top of wall 70 functions as a cam to cause ball bearings 100 to be forced radially outward, against the resilient force of expanding spring 102 outward. When ball bearings 100 encounter relief 72, they move outward, clicking into the space. When so positioned, third member 26 is captured in place, and centered. To the extent that the overhang of second member 24 encounters third member 26, the urging of ball bearings 100 into place may tend also to hold third member 26 against first member 22. For removal, the upper edge or side of relief 72 acts as a cam, so that upwardly axial movement of locking ring 60 tend to force ball bearings 100 outward, reversing the process.

Figure 9:
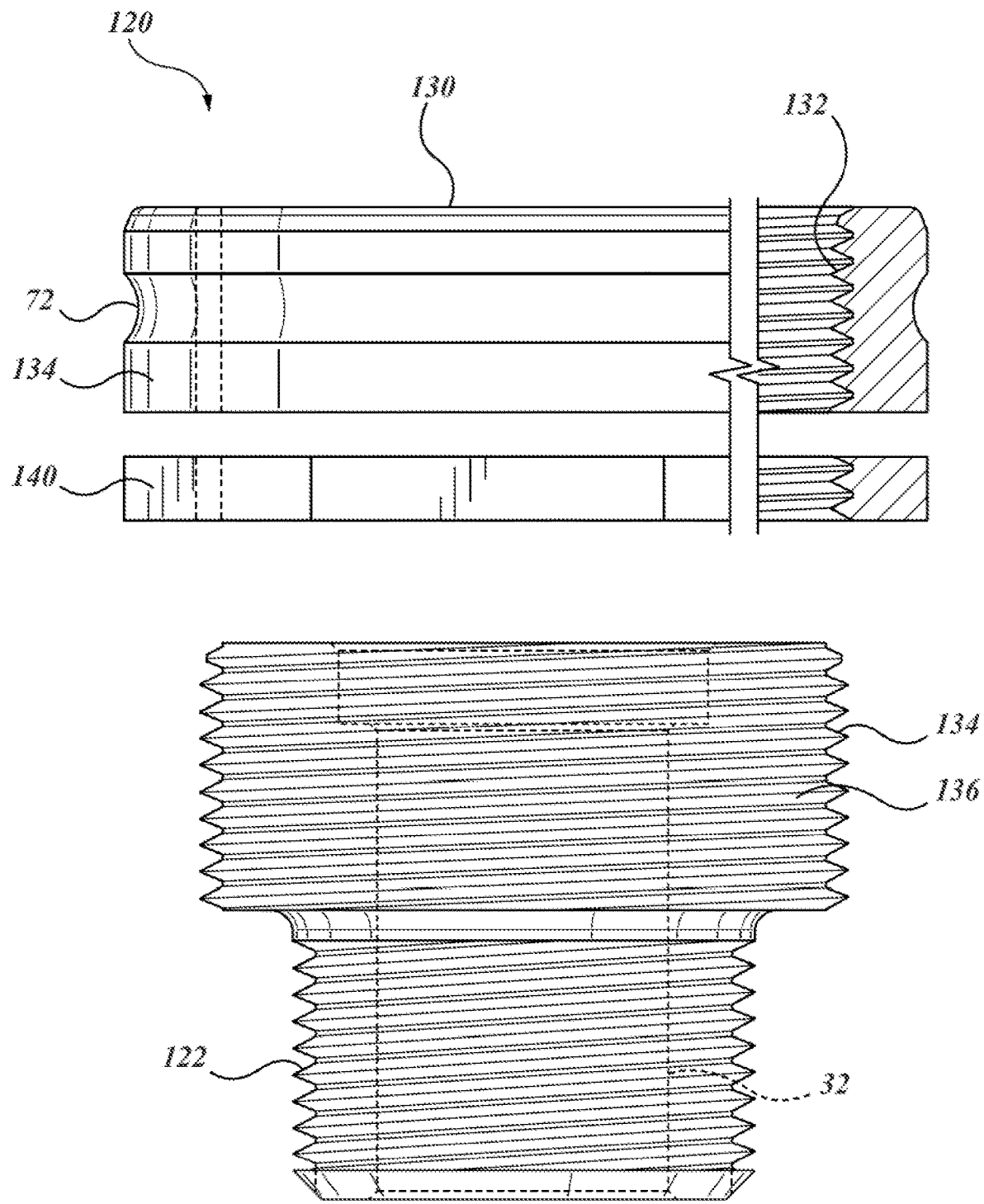
FIG. 9 shows a side view, in partial scab section, of an alternate embodiment to the welding apparatus of FIG. 1.

It may be desired to retrofit an existing welding base member. To that end, the embodiment of FIG. 9, shows a welding electrode apparatus 120 in which there is a first member 122, for use in conjunction with a second member analogous to member 24 and with a third member 26, as before. However, a sleeve 130 is provided, with internal threads 132 for threaded engagement to threads 134 of the upper portion 136 of first member 122. The radially outer wall 138 of sleeve 130 has the same cylinder-and-circumferential-groove features as the radially outer wall 70 of first member 22, although on a larger diameter. The second member is likewise the same as second member 24, but on a larger diameter to correspond to the outside of sleeve 130. The operation is the same as for apparatus 20. The use of an adapter, such as sleeve 130, permits the unit to be retro-fit onto an existing base such as first member 122. A lock-nut 140 co-operates with sleeve 130 to fix it in an appropriate axial position relative to first member 122, such that when the locking ring, i.e., second member 124, is seated the ball bearings 100 engage the corresponding groove 72 with the welding tip held in place.

In either case, the inside face of the second member 24 may be anodized, such as with an aluminum oxide coating, to discourage galling between the parts. Similarly, the use of a stainless steel ball may tend to resist galling, and the use stainless steel means that the detent has a higher melting point than the adjacent copper or copper alloys.

Accordingly, the apparatus described above provides a quick-release fitting to ease the change of the electrode tip during maintenance. Inasmuch as the interface is not threaded, neither the base member nor the locking ring undergo the repeated threading and un-threading that has a tendency, over time, to lead to mis-threading or cross-threading of the parts.

In the alternate embodiment of FIGS. 11a-11d, 12a-12c, and 13a-13c there is a welding electrode apparatus 150 that is operable to capture a welding electrode tip, namely third member 26. Welding electrode apparatus 150 has a first member 152 and a second member 154. First member 152 defines an electrode base, just as did first member 22. Second member 154 is a locking ring. Electrode base 152 has a first or lower portion 156 and a second or upper portion 158. Lower portion 156 has an engagement fitting 160 by which it interacts with the welding electrode head (not shown). Engagement fitting 160 may be a mating mechanical interface, or a mechanical interlink. A form of mechanical interlink is a set of threads 162. Threads 162 may be internal or external. In the example shown they are external. In use, electrode base 152 is mounted to a welding head, as before.

Upper portion 158 includes a cylindrical body that has a circumferential groove 164 formed between upper and lower flanges 166, 168. There is a central bore 170 that accommodates an insulator in the form of an insulated sleeve 172. The upper end of bore 170 has a shoulder 174 that engages the corresponding mating radially outwardly extending shoulder 176 of insulator 172. Upper portion 158 also has a pair of bores 178 through the upper and lower flanges, the bores being diametrically opposed. These bores provide sockets by which a wrench can tighten first member 152 on the threaded electrode head. Cylindrical groove 164 defines an indexing fitting, or fittings, of upper portion 158 of electrode base 152.

The second portion, namely locking ring 154, has the general form of a hollow cylinder that that has a bore 180 having an internal diameter that is slightly larger than the outside diameter of the upper portion 158 of electrode base 152. The uppermost end of the internal bore has a radially inwardly extending shoulder or lip 182 that is formed to capture the welding electrode tip 26. The inside shoulder or lip may be, and as shown is, chamfered to correspond to the mating chamfer of welding tip 26.

The cylindrical body of locking ring 154 has a pair of slots 184, 186 machined into the cylinder wall. Slots 184, 186 extend in a plane cross-wise to the axis of the cylinder and are formed on parallel off-sets from the central axis. They have a depth greater than the thickness of the annular wall of the cylinder to leave two axial linking wall portions 188, 190. The resultant side faces 192, 194 of linking portions 188, 190 align roughly with the radius of the bottom of groove 164 of first portion 152. This geometry leaves a pair of side openings 196, 198 in the sides of the cylinder, closer to the bottom end of the cylinder rather than the top, chamfered end to line up in use in the same radial-circumferential plane as groove 164.

Assembly 150 also includes a retainer or clip 200. Clip 200 may have the form of a stamped clip 202 or a bent wire clip 204, in either case made of a sprung steel. In each case clip 200 has a generally U-shape with a back 210 and a pair of spaced apart legs 212, 214 that are joined to and extend forwardly away from back 210. These clips are springs, and they resist lateral deflection of the legs, or, expressed differently, they permit lateral resilient flexing of the legs, but, being springs, they are spring-biased against such deflection. As may be noted clip 200 has a knob-like inwardly deviated toe 216 formed at the distal extremities of the legs, the clearance between the toes being less than the dimension over the surfaces of faces 192, 194. This means that installation or removal of clip 200 requires outward spring deflection to allow toes 216 to deflect and ride over faces 192, 194. In the case of clip 202, there is a relief 218 in back 210. Relief 218 admits the end of a flat-headed screw-driver, allowing legs 212, 214 to be pulled rearwardly, thus forcing toes 216 to spread and ride over the radiused corners of faces 192, 194. The spreading of the legs in the case of either stamped clip 202 or formed spring wire 204 moves them out of engagement with groove 164 and allows second portion 154 to be displaced axially away from first portion 152, thereby releasing welding tip 26 for replacement and installation of a new welding tip 26.

In this arrangement, legs 212, 214 function as dogs that seat in the accommodations defined by seats 184, 186 extend through side-openings 196, 198 of the annular central body of locking ring 154. Legs 212, 214 are thus mounted within locking ring 154. Locking ring 154 has a retainer, namely clip 200, mounted to capture welding electrode tip 26 next to, and in electrically conductive engagement with, said electrically conductive seat of welding base 152. Locking ring 154 has a dog, or dogs, namely legs 212, 214. The dogs are movable, i.e., when the toes function as cam followers on the machined cylinder radii and flats. The dogs defined by legs 212, 214 are spring-biased toward engagement with the indexing fitting defined by groove 164. Locking ring 154 is operable to secure welding electrode tip 26 to electrode base 152 in electrically conductive engagement therewith. Electrode base 152 and locking ring 154 are mutually engageable. The dogs are displaceable to permit disengagement of locking ring 154 from electrode base 156. As may be noted, it is possible to make a functioning clip, in the form of a cotter pin, that has only a single dog, or deflecting leg, where the other leg follows the outside circumference of the locking ring rather than being straight. The locking ring need not have a circular exterior wall, it could be of many different shapes. It is convenient that it be round and cylindrical.

When first and second members 152, 154 are engaged, the dog, leg 212, 214 is entrapped between them. As above, at least first member 152 is made of a material that is predominantly copper and dog 212, 214 has a higher melting point than copper. The dog, be it leg 212 or 214 includes, or is, a movable detent. The spring-biased detent is captured between first member 152 and the second member 154 when second member 154 is seated on first member 152. The electrode base 152 has an external relief 164. The dog of legs 212, 214 is mounted within locking ring 154. The dog, or dogs, defined by either or both of legs 212, 214 deflect to permit installation of locking ring 154 on electrode base 152. The dog is biased to engage the relief of groove 164 to seat locking ring 154 relative to electrode base 152. Where both legs 212, 214 are used, the apparatus had a plurality of the dogs. As described, electrode base 152 has an external peripheral relief in the form of groove 164. Locking ring 154 has an array of accommodations, namely slots 184, 186, and each of the plurality of dogs defined by legs 212, 214 seats in a corresponding one of those accommodations. The spring defined by clip 200 urges the dogs inwardly toward electrode base 152 as assembled.

Electrode base 152 has a first portion 156 and a second portion 158. First portion 156 is threaded to permit electrode base 152 to be mounted to the welding head. Second portion 158 extends axially from first portion 158. Second portion 158 has a first end adjoining first portion 156 and a second end distant from first portion 156. The second end has, or defines, an electrically conductive seat. Second portion 158 has an externally facing, axially extending cylindrical wall extending between the first end and the second end. The cylindrical wall has the indexing fitting 164. Locking ring 154 is sized to seat about second portion 158 of electrode base 152. Welding electrode tip 26 is releasably captured next to, and in electrically conductive engagement with, the electrically conductive seat of base member 152. The dog, be it 212, 214 or both, is internally located within locking ring 154, and is resiliently mounted. The dog is, or dogs are, biased toward engagement with indexing fitting 164 of the cylindrical wall. The dog, i.e., leg 212, 214, is displaceable from indexing fitting 164 to permit disengagement of locking ring 154 from base member 152.

The indexing fitting of base 152 is circumferential groove 164 formed in the cylindrical wall. The dog of locking ring 154 includes at least one spring-loaded clip 200, clip 200 being biased to seat in groove 164 on installation. In one embodiment, the clip has a removal fitting in the form of relief 218. Electrode base 152 has an internal insulated sleeve 172. Internal insulated sleeve 172 has an axial bore 220 formed therethrough to admit a reciprocating work piece centering pin 42.

Although the present description is provided in the context of first and second window sub-assemblies that combine to form a larger assembly that fills the window envelope or accommodation formed in the door panel, it will be understood that such an assembly could employ additional window extensions, as may be.

We claim:

1. A welding electrode apparatus operable to capture a consumable welding electrode tip, said welding electrode apparatus comprising:
   a first member and a second member;
   said first member defining an electrode base;
   said second member being a locking ring;
   said electrode base having an electrically conductive seat;
   said electrode base having an indexing fitting;
   said locking ring having a retainer mounted to capture the consumable welding electrode tip next to, and in electrically conductive engagement with, said electrically conductive seat of said electrode base; and
   said locking ring having a dog, said dog being movable, said dog being spring-biased toward engagement with said indexing fitting; and
   said locking ring being operable to secure the consumable welding electrode tip to said electrode base in electrically conductive engagement therewith;
   said electrode base and said locking ring being mutually engageable; and
   said dog being displaceable to permit disengagement of said locking ring from said electrode base.

2. The welding electrode apparatus of claim 1 wherein, when said first and second members are engaged, said dog is entrapped therebetween.

3. The welding electrode apparatus of claim 1 wherein said first member is made of a material that is predominantly copper.

4. The welding electrode apparatus of claim 1 wherein said dog has a higher melting point than copper.

5. The welding electrode apparatus of claim 1 wherein said dog includes a movable detent.

6. The welding electrode apparatus of claim 1 wherein:
   at least said first member is made of a material that is predominantly copper;
   said dog includes a spring-biased detent, said spring-biased detent being made of a material having a higher melting point than copper; and
   said spring-biased detent being captured between said first member and said second member when said second member is seated on said first member.

7. The welding electrode apparatus of claim 1 wherein said electrode base has an external relief that defines said indexing fitting of said electrode base, said dog is mounted within said locking ring; said dog deflects to permit installation of said locking ring; and said dog is biased to engage said relief to seat said locking ring relative to said electrode base.

8. The welding electrode apparatus of claim 1 wherein:
   said welding electrode apparatus had a plurality of said dogs;
   said electrode base has an external peripheral relief that defines said indexing fitting of said electrode base;
   said locking ring has an array of accommodations, and each of said plurality of dogs seats in a corresponding one of said accommodations;
   said locking ring has a peripherally extending relief and a spring mounted therein; and
   said spring bounds said accommodations of said dogs, and, as so mounted, urges said dogs inwardly toward said electrode base as assembled.

9. The welding electrode apparatus of claim 8 wherein said locking ring has an external portion that mounts outwardly of said spring, said external portion having at least one grip member formed thereon.

10. The welding electrode apparatus of claim 1 wherein said electrode base is externally threaded, and said indexing fitting includes an internally threaded sleeve engageable to said externally threaded welding base; and said dog engages said internally threaded sleeve.

11. The welding electrode apparatus of claim 1 wherein:
   said electrode base has a first portion and a second portion;
   said first portion of said electrode base is threaded to permit said electrode base to be mounted to a welding head;
   said second portion extends axially from said first portion;
   said second portion has a first end adjoining said first portion and a second end distant from said first portion;
   said second end having said electrically conductive seat;
   said second portion having an externally facing, axially extending cylindrical wall extending between said first end and said second end;
   said cylindrical wall has said indexing fitting;
   said locking ring being sized to seat about said second portion of said electrode base;
   said welding electrode tip being releasably captured next to, and in electrically conductive engagement with, said electrically conductive seat of said electrode base; and
   said dog being internally located within said locking ring, said dog being resiliently mounted, and said dog being biased toward engagement with said indexing fitting of said cylindrical wall; and
   said dog being displaceable from said indexing fitting to permit disengagement of said locking ring from said electrode base.

12. The welding electrode apparatus of claim 11 wherein said indexing fitting of said electrode base is a circumferential groove formed in said cylindrical wall; and said dog of said locking ring includes at least one spring-loaded ball-bearing, said ball-bearing being biased to seat in said groove on installation.

13. The welding electrode apparatus of claim 12 wherein said locking ring includes an external housing that has a relief grip.

14. The welding electrode apparatus of claim 11 wherein said electrode base has an internal insulated sleeve, and said internal insulated sleeve has an axial bore formed therethrough to admit a reciprocating work piece centering pin.

15. The welding electrode apparatus of claim 11, and including said welding electrode tip, wherein said electrode base and said welding tip are each made of a material that is predominantly copper and said dog has a higher melting point than copper.

16. The welding electrode apparatus of claim 11, and including the welding electrode tip, wherein:
   at least said electrode base and said welding electrode tip are each made of a material that is predominantly copper;
   said dog includes a spring-biased detent, said spring-biased detent being made of a material having a higher melting point than copper; and
   said spring-biased detent being captured between said electrode base and said locking ring when said locking ring is seated on said electrode base.

17. The welding electrode apparatus of claim 16 wherein said indexing fitting of said electrode base includes an external relief, said dog is mounted within said locking ring; said dog deflects to permit installation of said locking ring; and said dog is biased to engage said relief to seat said locking ring relative to said electrode base.

18. The welding electrode apparatus of claim 16 wherein:
   said apparatus had a plurality of said dogs;
   said indexing fitting of said electrode base includes a first external peripheral relief;
   said locking ring has an array of accommodations, and each of said plurality of dogs seats in a corresponding one of said accommodations;
   said locking ring has a second peripherally extending relief and a spring mounted therein; and
   said spring bounds said accommodations of said dogs, and, as so mounted, urges said dogs inwardly toward said electrode base as assembled.

19. The welding electrode apparatus of claim 18 wherein said locking ring has an external portion that mounts outwardly of said spring, said external portion having at least one grip formed thereon.

20. A welding electrode apparatus operable to capture a consumable welding electrode tip, said welding electrode apparatus comprising:
   a first member and a second member;
   said first member defining an electrode base;
   said second member being a locking ring;
   said electrode base having an electrically conductive seat;
   said electrode base having an indexing fitting;
   said locking ring having a retainer mounted to capture the consumable welding electrode tip next to, and in electrically conductive engagement with, said electrically conductive seat of said electrode base; and
   said locking ring having a dog, said dog being movable, said dog being spring-biased toward engagement with said indexing fitting;
   said locking ring being operable to secure the consumable welding electrode tip to said electrode base in electrically conductive engagement therewith;
   said electrode base and said locking ring being mutually engageable;
   said dog being displaceable to permit disengagement of said locking ring from said electrode base;
   said indexing fitting includes a sleeve and said dog engages said sleeve.

* * * * *